US006686567B1

(12) United States Patent
Hwang

(10) Patent No.: US 6,686,567 B1
(45) Date of Patent: Feb. 3, 2004

(54) COOKING APPARATUS HAVING HEATERS

(75) Inventor: Yun-Ic Hwang, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/279,879

(22) Filed: Oct. 25, 2002

(30) Foreign Application Priority Data

Aug. 20, 2002 (KR) ........................................ 2002-49326

(51) Int. Cl.[7] ............................ H05B 6/64; A21B 1/22; F27D 11/02

(52) U.S. Cl. ........................................ 219/404; 219/393

(58) Field of Search ................................ 219/393, 403, 219/408, 411, 685; 126/190, 192, 340

(56) References Cited

U.S. PATENT DOCUMENTS 2,848,592 A * 8/1958 Mergen ...................... 219/404
3,281,575 A * 10/1966 Ferguson .................... 219/404
4,596,914 A * 6/1986 Morino ........................ 219/404
5,534,681 A * 7/1996 Hwang ........................ 219/404
5,747,781 A * 5/1998 Kim et al. .................. 219/404
6,232,584 B1 5/2001 Meyer

FOREIGN PATENT DOCUMENTS

WO 9723756 * 7/1997

* cited by examiner

*Primary Examiner*—Joseph Pelham
(74) *Attorney, Agent, or Firm*—Staas & Halsey LLP

(57) ABSTRACT

A cooking apparatus having a heater is disclosed. The cooking apparatus is operated in a cleaning mode to clean a cooking chamber. When the cleaning mode is selected, the heater is moved to one of various positions to afford a sufficient space to clean the cooking chamber.

21 Claims, 5 Drawing Sheets

COOKING APPARATUS HAVING HEATERS

CROSS-REFERENCE TO RELATED APPLICATION

This application claims the benefit of Korean Application No. 2002-49326, filed Aug. 20, 2002, in the Korean Intellectual Property Office, the disclosure of which is incorporated herein by reference.

BACKGROUND OF THE INVENTION

1. Field of the Invention

The present invention relates to a cooking apparatus, and more particularly, to a cooking apparatus having heaters.

2. Description of the Related Art

In general, a microwave oven is used to heat food by electromagnetic waves generated from a magnetron. Where such a microwave oven is equipped with an additional heater, the microwave oven can further fulfill various cooking modes such as a baking function and a broiling function.

SUMMARY OF THE INVENTION

Accordingly, it is an aspect of the present invention to provide a cooking apparatus having heaters is provided, in which the heaters are moveable in a cleaning mode, so as to assure sufficient spaces to easily clean an inside of a cooking chamber.

Additional aspects and advantages of the invention will be set forth in part in the description which follows and, in part, will be obvious from the description, or may be learned by practice of the invention.

In order to accomplish the above and other aspects, a cooking apparatus is provided comprising: a cooking chamber defined in the cooking apparatus; and a heater provided in the cooking chamber, wherein the cooking apparatus is operated in a cleaning mode, whereby the heater is moved to a first position to assure sufficient spaces to allow an inside of the cooking chamber to be easily cleaned in the cleaning mode.

BRIEF DESCRIPTION OF THE DRAWINGS

These and other aspects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
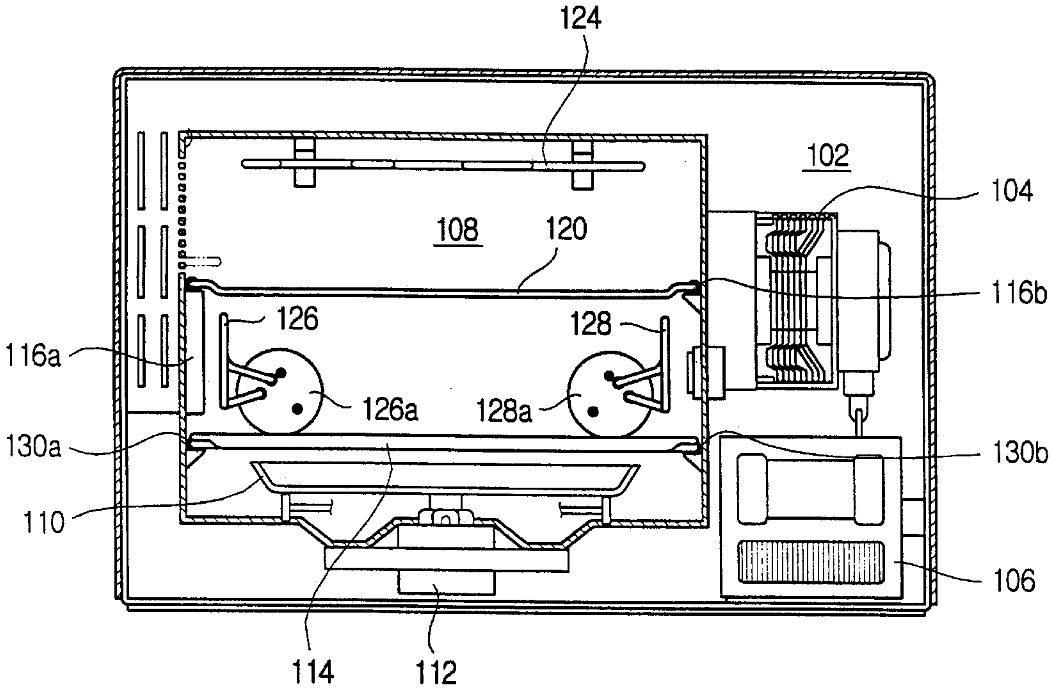
FIG. 1 is a cross-sectional view of a microwave oven having heaters.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 shows a related microwave oven having heaters invented by the inventor of the present invention, in which a door of the microwave oven is opened. As shown in FIG. 1, an electric component compartment 102 is provided therein with a magnetron 104 to generate electromagnetic waves. The magnetron 104 is supplied with electric power of very high voltage from an electric power supply 106.

A cooking chamber 108 is provided at a bottom surface of the cooking chamber 108 with a glass tray 110, which is used during cooking, as electromagnetic waves generated from the magnetron 104, to cook food. The glass tray 110 is rotated by a motor 112. The cooking chamber 108 is provided therein with an upper heater 124 and a pair of lower heaters 126 and 128. The upper heater 124 is mounted on a ceiling of the cooking chamber 108 to radiate heat toward an upper surface of the food. A grill 120 is disposed below the upper heater 124. The grill 120 is placed on grill supports 116*a* and 116*b* so as to be mainly used in broiling meat or fish. The pair of lower heaters 126 and 128 is disposed below the grill 120. Disposed below the pair of lower heaters 126 and 128 is a plate 114. The plate 114 is placed on plate supports 130*a* and 130*b* so as to be used in baking such as breads or biscuits.

The pair of lower heaters 126 and 128 is positioned between the grill 120 and the plate 114. In the case of cooking the food on the grill 120, the food, placed on the grill 120, is heated at a lower surface of the food. In the case of cooking the food by the plate 114, the food, placed on the plate 114, is heated at an upper surface of the food. The lower heaters 126 and 128 are coupled to rotating members 126*a* and 128*a*, respectively. Therefore, as the rotating members 126*a* and 128*a* are rotated, the pair of lower heaters 126 and 128 are, respectively, rotated along with the rotating members 126*a* and 128*a*.

In the above microwave oven, since the pair of lower heaters 126 and 128 are positioned very close to respective inner side surfaces of the cooking chamber 108 when the microwave oven is not used, cleaning the respective inner side surfaces of the cooking chamber 108 is very difficult.

The invention will be described in further detail by way of example with reference to FIGS. 2 to 5 of the accompanying drawings.

Figure 2:
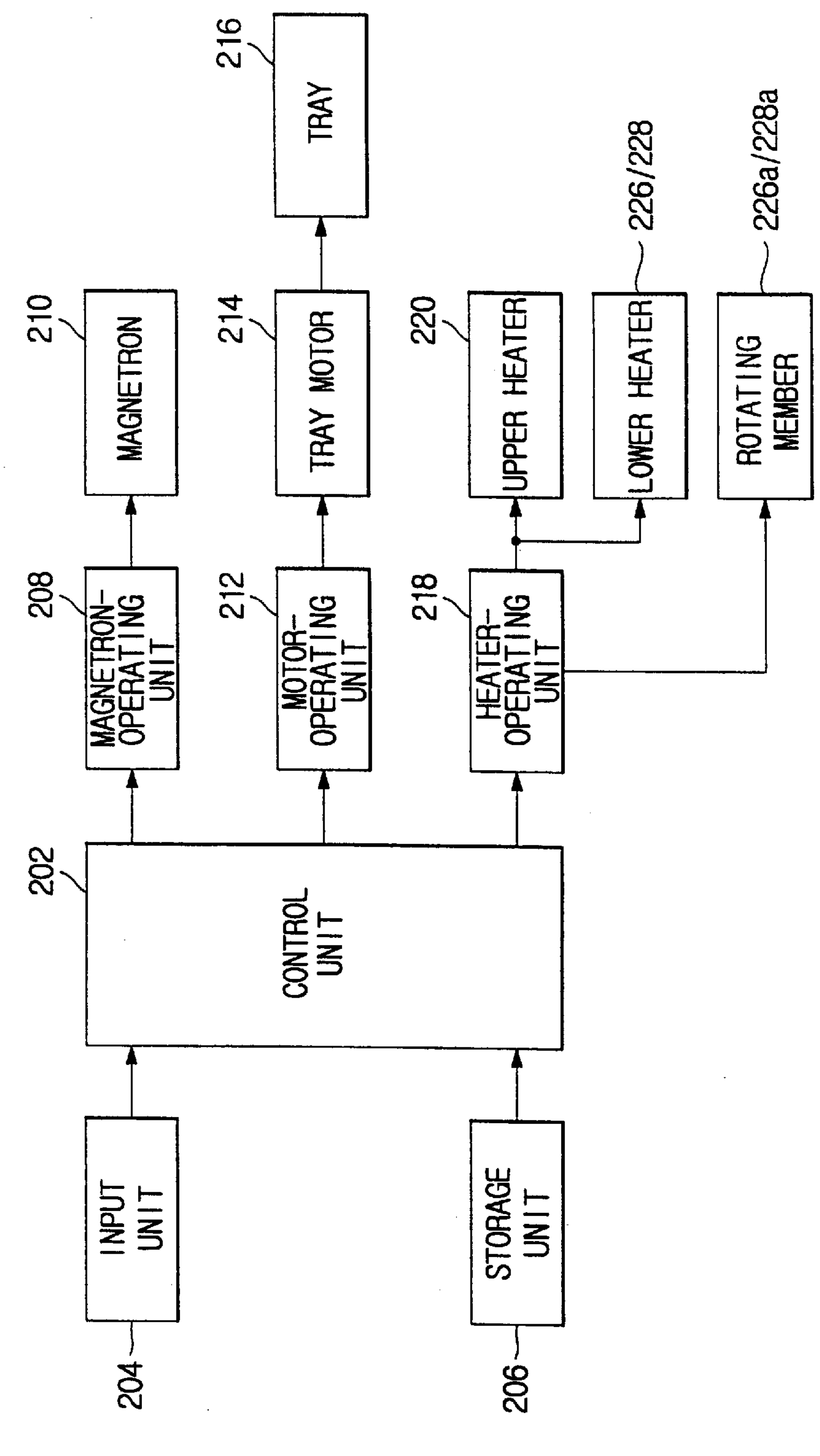
FIG. 2 is a block diagram showing a microwave oven having heaters according to an embodiment of the present invention.
Figure 3:
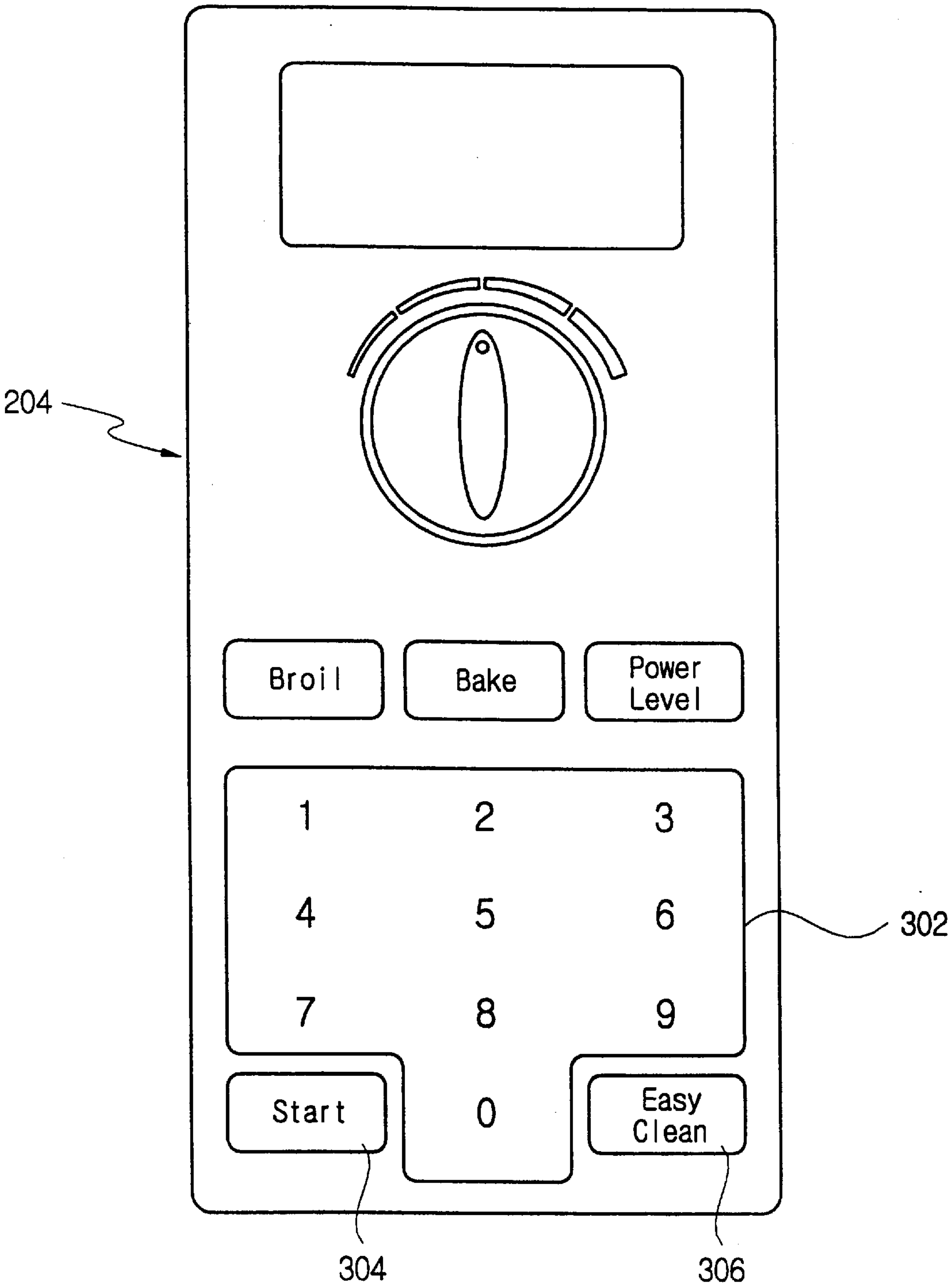
FIG. 3 is a view showing an input unit of the microwave oven according to the embodiment of the present invention.

FIG. 2 is a block diagram showing a microwave oven having heaters according to an embodiment of the present invention. As shown in FIG. 2, the microwave oven includes a control unit 202 to control an overall operation of the microwave oven. The control unit 202 is connected to an input unit 204 and a storage unit 206 at an input terminal of the control unit 202. The input unit 204 is provided with an easy clean button 306, as shown in FIG. 3, as well as various keys, such as numerical keys and mode selection keys, which allow a user to set a cooking mode and a time. The storage unit 206 stores data required to perform various cooking operations.

Figure 4:
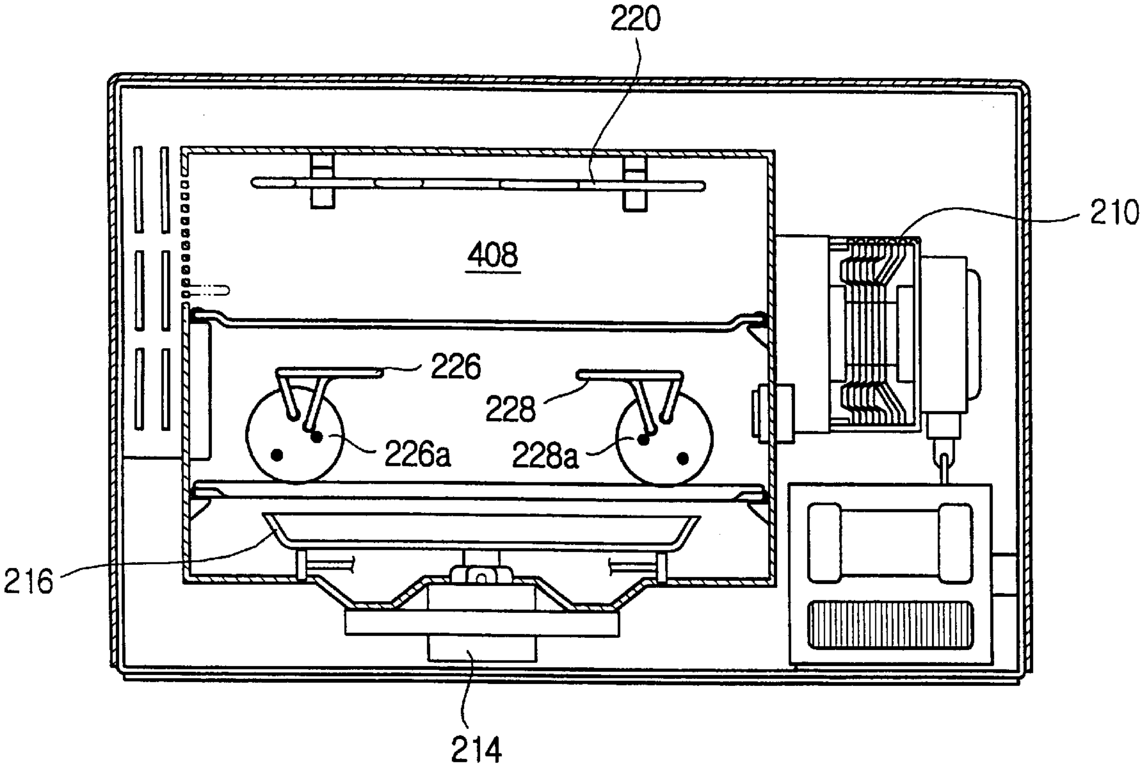
FIG. 4 is a cross-sectional view showing the microwave oven according to the embodiment of the present invention, in which lower heaters are extended toward each other.

A magnetron-operating unit 208, a motor-operating unit 212 and a heater-operating unit 218 are connected to an output terminal of the control unit 202. The magnetron-operating unit 208 serves to drive a magnetron 210 which generates electromagnetic waves. The motor-operating unit 212 serves to drive a tray motor 214, thereby rotating a tray 216 disposed in a cooking chamber 408 as shown in FIG. 4. The heater-operating unit 218 causes an upper heater 220 and lower heaters 226 and 228 to emit heat, in response to instructions of the control unit 202. Power to the upper heater 220 and lower heaters 226 and 228 is controlled by the control unit 202 such that the power to the upper heater 220 and lower heaters 226 and 228 of the microwave oven in the cleaning mode is stopped and thereby the upper heater 220 and lower heaters 226 and 228 are prevented from emitting heat in the cleaning mode. In particular, the heater-operating unit 218 controls not only heating conditions of the lower heaters 226 and 228, but also rotating conditions of the lower heaters 226 and 228. More specifically, when the microwave oven is operated in a cooking mode, rotating members 226*a* and 228*a* associated with the lower heaters 226 and 228, respectively, are rotated toward each other to cause the lower heaters 226 and 228 to be extended toward a center of the cooking chamber 408. When the cooking mode is completed, the rotating members 226*a* and 228*a* are rotated in respective reverse directions to cause the lower heaters 226 and 228 to be returned to respective rest positions.

FIG. 3 shows the input unit of the microwave oven according to the embodiment of the present invention. As shown in FIG. 3, the input unit 204 is provided with a numerical keypad 302, a start button 304 and an easy clean button 306. The numerical keypad 302 comprises numerical buttons, which indicate numeric characters "0"–"9", respectively, so that a user can input various setting values necessary to cook the food. The start button 304 enables the microwave oven to initiate a currently set cooking mode. The easy clean button 306 allows a user to select an easy clean mode. In the easy clean mode, since the lower heaters 226 and 228 are rotated toward each other, that is, toward the center of the cooking chamber 408, thereby affording sufficient spaces between the lower heaters 226 and 228 and respective inner side surfaces of the cooking chamber 408, a user can easily clean the respective inner side surfaces of the cooking chamber 408.

FIG. 4 is a cross-sectional view showing the microwave oven according to the embodiment of the present invention, in which the lower heaters 226 and 228 are extended toward the center of the cooking chamber in the easy clean mode. As shown in FIG. 4, in the easy clean mode, the lower heaters 226 and 228 are extended toward the center of the cooking chamber 408. Therefore, sufficient spaces are provided between the lower heaters 226 and 228 and the respective inner side surfaces of the cooking chamber 408, allowing a user to easily clean the respective inner side surfaces.

Figure 5:
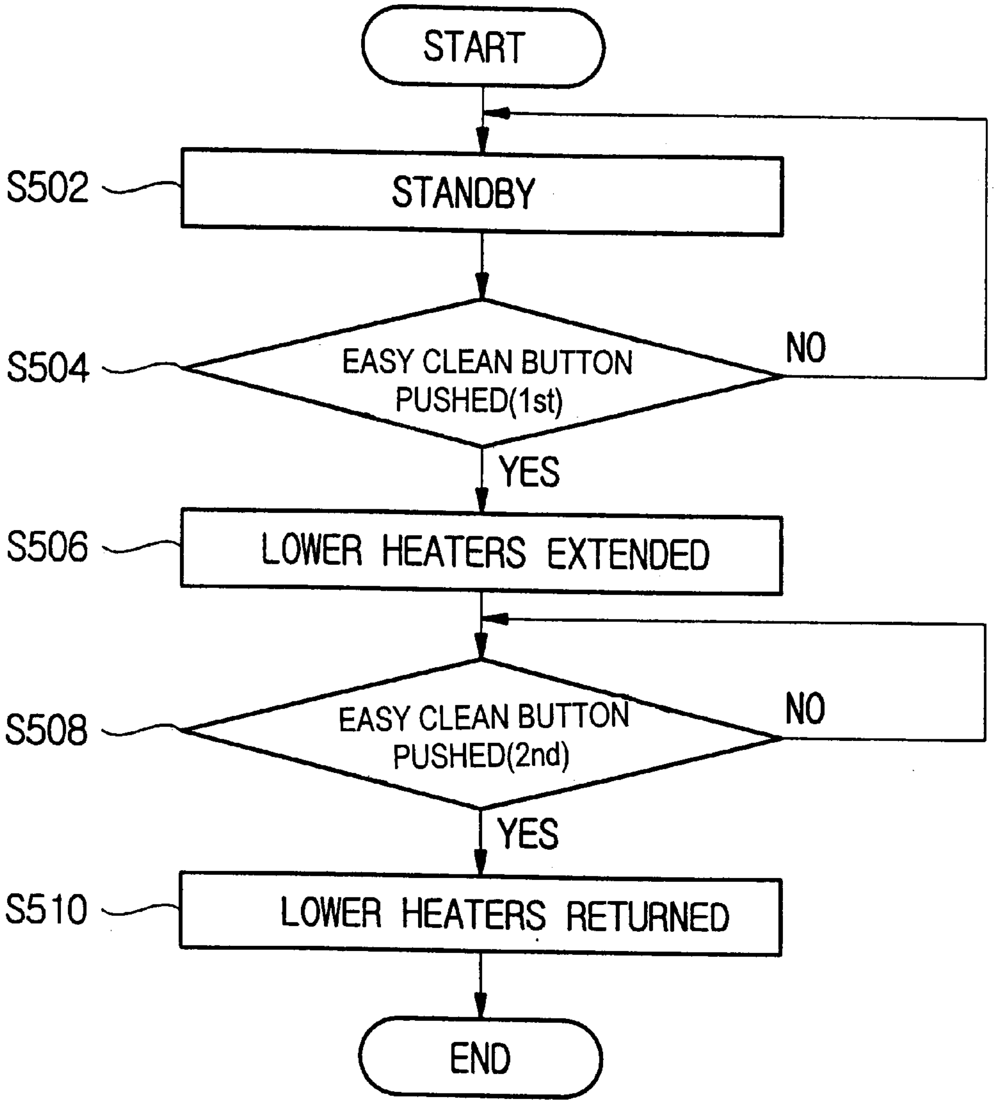
FIG. 5 is a flow chart showing a method of controlling the microwave oven according to the embodiment of the present invention.

FIG. 5 is a flow chart showing a method of controlling the microwave oven according to the embodiment of the present invention. As shown in FIG. 5, from a standby mode at operation S502, the control unit 202 determines whether the easy clean button 306 is pushed at operation S504. If the easy clean button 306 is pushed once or more, the control unit 202 controls the rotating members 226*a* and 228*a* to be rotated toward each other, so that the lower heaters 226 and 228 are extended toward the center of the cooking chamber 408 at operation S506. As a result, sufficient spaces are provided between the lower heaters 226 and 228 and the respective inner side surfaces of the cooking chamber 408, thereby facilitating a cleaning operation of the respective inner side surfaces of the cooking chamber 408.

After the lower heaters 226 and 228 are extended in response to the easy clean button 306 being pushed once, the control unit 202 determines whether the easy clean button 306 is further pushed at operation S508. If the easy clean button 306 is pushed once more, the control unit 202 controls the rotating members 226*a* and 228*a* to be rotated in respective reverse directions, thereby causing the lower heaters 226 and 228 to be returned to respective original rest positions at operation S510. When the easy clean button 306 is pushed once by the user, the lower heaters 226 and 228 are extended toward the center of the cooking chamber 408, thereby allowing easy cleaning of the respective inner side surfaces of the cooking chamber 408. Thereafter, when the easy clean button 306 is pushed once more, the lower heaters 226 and 228 are returned to the respective rest positions of the lower heaters 226 and 228.

As described above, a cooking apparatus equipped with heaters which are adapted to be moved to predetermined positions, so as to afford sufficient spaces to easily clean the respective inner side surfaces of a cooking chamber in a cleaning mode is provided. Furthermore, since the heaters can be moved to desired positions, all areas of the cooking chamber can be easily cleaned. It is understood that the present invention can be applied to all types of cooking apparatuses having heaters.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cooking apparatus comprising:

a cooking chamber defined in the cooking apparatus; and a heater provided in the cooking chamber, wherein when the cooking apparatus is operated in a cleaning mode, the heater is moved to a first position to assure a sufficient space to allow an inside of the cooking chamber to be easily cleaned in the cleaning mode.

2. The cooking apparatus as set forth in claim 1, further comprising:

a cleaning button to allow a user to select the cleaning mode, wherein when the cleaning button is pushed after the cleaning mode is selected, the heater is moved to a second position.

3. The cooking apparatus as set forth in claim 2, wherein every time the cleaning button is pushed, the heater is moved to one of two or more positions.

4. The cooking apparatus as set forth in claim 1, wherein the heater does not emit heat in the cleaning mode.

5. A control device for a cooking apparatus including a heater in a cooking chamber of the cooking apparatus, comprising:

a cleaning button to allow a user to select a cleaning mode; and a control unit to control the heater to be moved, thereby affording a sufficient space to clean the cooking chamber, when the cleaning mode is selected.

6. The control device as set forth in claim 5, wherein when the cleaning button is pushed after the cleaning mode is selected, the heater is moved to an operational position.

7. A cooking apparatus with a cooking chamber therein, comprising:

a heater movably provided in the cooking chamber and when a cleaning mode is initiated, the heater is moved from a first position to one or more other positions to ensure a sufficient space to clean an inside of the cooking chamber.

8. The cooking apparatus as set forth in claim 7, further comprising:

a cleaning button to initiate the cleaning mode and when the cleaning button is manipulated to initiate the cleaning mode, the heater is moved to one of the other positions.

9. The cooking apparatus as set forth in claim 7, wherein the heater is moved by a rotation of the heater.

10. The cooking apparatus as set forth in claim 8, wherein when a cleaning button is manipulated, while the heater is in the second position, the heater is rotated to the first position.

11. The cooking apparatus as set forth in claim 7, wherein each time the cleaning button is manipulated, the heater is rotated to one of the other positions.

12. The cooking apparatus as set forth in claim 7, wherein in the cleaning mode, power to the heater to heat the cooking chamber is stopped.

13. A control device for a cooking apparatus including a rotatable heater in a cooking chamber of the cooking apparatus, comprising:

a cleaning button to initiate a cleaning mode; and a control unit to control the heater to be rotated, thereby ensuring a sufficient space to clean an inside of the cooking chamber.

14. The control device as set forth in claim 13, wherein when the cleaning button is manipulated after the cleaning mode is initiated, the heater is rotated to an operational position.

15. A control device for a cooking apparatus including a rotatable heater in a cooking chamber of the cooking apparatus, comprising:

a cleaning button to initiate a cleaning mode; and a control unit to control the heater to be rotated from a first position to one or more other positions, thereby ensuring a sufficient space to clean an inside of the cooking chamber.

16. A method of controlling a cooking apparatus having a cooking chamber therein, comprising:

initiating a cleaning mode; and rotating a heater provided in the cooking chamber from a first position to one or more other positions to ensure a sufficient space to clean an inside of the cooking chamber.

17. A method of controlling a cooking apparatus having a cooking chamber therein, comprising:

initiating a cleaning mode by a manipulation of a cleaning button;

after said initiating, rotating a heater provided in the cooking chamber from a first position to one or more other positions to ensure a sufficient space to clean an inside of the cooking chamber; and after said initiating, manipulating again the cleaning button to rotate the heater to the first position.

18. The cooking apparatus according to claim 7, further comprising:

a control unit to control a position of the heater; and a rotating member coupled to the heater and under the control of the control unit rotating the heater in the cooking chamber.

19. A cooking apparatus with a cooking chamber therein, comprising:

at least two heaters movably provided in the cooking chamber and when a cleaning mode is initiated, the at least two heaters are rotated in directions away from walls of the cooking chamber.

20. A cooking apparatus with a cooking chamber therein, comprising:

at least two heaters movably provided in the cooking chamber and when a cleaning mode is initiated, the at least two heaters are rotated in respective directions from respective first positions to respective second positions so as to ensure sufficient space to clean an inside of the cooking chamber.

21. A cooking apparatus with a cooking chamber therein, comprising:

at least two heaters movably provided in the cooking chamber and when a cleaning mode is initiated, the at least two heaters are rotated in respective directions from respective first positions to respective second position in which the respective second positions are farther from respective inner side wall of the cooking chamber.

* * * * *